US008830458B2

(12) United States Patent
Shyu et al.

(10) Patent No.: US 8,830,458 B2
(45) Date of Patent: Sep. 9, 2014

(54) MEASUREMENT SYSTEMS AND MEASUREMENT METHODS

(71) Applicant: Industrial Technology Research Institute, Hsinchu (TW)

(72) Inventors: Deh-Ming Shyu, Miaoli County (TW); Yi-Sha Ku, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 32 days.

(21) Appl. No.: 13/752,307

(22) Filed: Jan. 28, 2013

(65) Prior Publication Data

US 2014/0085640 A1 Mar. 27, 2014

(30) Foreign Application Priority Data

Sep. 24, 2012 (TW) .............................. 101134870 A

(51) Int. Cl.
*G01N 21/00* (2006.01)
*G01B 11/24* (2006.01)
(52) U.S. Cl.
CPC ...................................... *G01B 11/24* (2013.01)
USPC .................................... 356/237.6; 356/241.1
(58) Field of Classification Search
USPC ...................... 356/237.1–237.6, 241.1, 241.2
See application file for complete search history.

(56) References Cited

U.S. PATENT DOCUMENTS 3,661,440 A * 5/1972 Takahashi ..................... 359/368
4,145,714 A * 3/1979 MacDonald et al. ......... 348/131
4,560,273 A * 12/1985 Ando et al. ................. 356/237.6
6,580,502 B1 * 6/2003 Kuwabara ................. 356/237.3
7,777,898 B2 * 8/2010 Matsumura et al. .......... 356/614
2005/0074049 A1 4/2005 Tanaka et al.

FOREIGN PATENT DOCUMENTS

| JP | 11-153534 | 6/1999 |
|---|---|---|
| TW | 200608053 | 3/2006 |
| TW | 200702906 | 1/2007 |
| TW | 200707564 | 2/2007 |
| TW | 200737290 | 10/2007 |
| TW | 200933714 | 8/2009 |
| TW | 200943394 | 10/2009 |
| TW | 201130123 | 9/2011 |

(Continued)

OTHER PUBLICATIONS

F. Infante et al., "Magnetic Microscopy for 3D Devices: Defect Localization with High Resolution and Long Working Distance on Complex System in Package", Microelectronics Reliability, Jul. 2009, pp. 1169-1174, vol. 49, Elsevier Ltd., US.

(Continued)

*Primary Examiner* — Hoa Pham

(57) ABSTRACT

A measurement system is provided to measure a hole of a target, including a light source generation unit, a capturing unit and a processing unit. The light source generation unit generates a light source and focuses the light source on a plurality of different height planes. The capturing unit captures a plurality of images scattered from the plurality of different height planes. The processing unit obtains boundaries of the hole on the plurality of different height planes according to the plurality of images, samples image intensities of different azimuth angles on the boundaries of the hole on each of the plurality of different height planes to generate a plurality of sampling values, and develops a sidewall image of the hole according to the plurality of sampling values, the plurality of different height planes and the different azimuth angles.

8 Claims, 8 Drawing Sheets

(56) References Cited

FOREIGN PATENT DOCUMENTS

| TW | 201144772 | 12/2011 |
| TW | 201237359 | 9/2012 |
| TW | 201237361 | 9/2012 |

OTHER PUBLICATIONS

V.N. Sekhar et al., "Non-Destructive Testing of High Dense Small Dimension Through Silicon Via (TSV) Array Structures by Using 3D X-ray Computed Tomography Method (CT Scan)", 12$^{th}$ Electronics Packaging Technology Conference, Dec. 2010, pp. 462-466, IEEE, US.

C. Cassidy et al., "Through Silicon Via (TSV) Defect Investigations Using Lateral Emission Microscopy", Microelectronics Reliability, Aug. 2010, pp. 1413-1416, vol. 50, Elsevier, US.

Marinissen, Erik J., "Challenges in Testing TSV-Based 3D Stacked ICs: Test Flows, Test Contents, and Test Access", Circuits and Systems (APCCAS) 2010 Asia Pacific Conference, Dec. 2010, pp. 544-547, IEEE, US.

Ramakanth Alapati et al., "TSV Metrology and Inspection Challenges", 3D System Integration, 2009. 3DIC 2009 IEEE International Conference, Sep. 2009, pp. 1-4, IEEE, US.

Sandip Halder et al., "Metrology and Inspection for Process Control During Bonding and Thinning of Stacked Wafers for Manufacturing 3D Sic's", 2011 Electronic Components and Technology Conference (ECTC), May 2011, pp. 999-1002, IEEE, US.

Taiwan Patent Office, Office Action, Patent Application U.S. Appl. No. 101134870, Jun. 4, 2014, Taiwan.

* cited by examiner

MEASUREMENT SYSTEMS AND MEASUREMENT METHODS

CROSS REFERENCE TO RELATED APPLICATION

This application claims priority of Taiwan Patent Application No. 101134870, filed on Sep. 24, 2012, the entirety of which is incorporated by reference herein.

BACKGROUND

1. Technical Field

The disclosure relates to measurement systems and measurement methods, and relates to a measurement system for measuring the boundary of a hole.

2. Description of the Related Art

Fabrication of 3D ICs via stacking has increased due to development and demand for more advanced and complex ICs. One type of IC packaging staking method is through-silicon via. The yield rates of ICs are affected by the accuracy of measuring through-silicon vias.

However, through-silicon vias have a high depth-width ratio. Thus, depth and sidewalls thereof cannot be measured by an optical microscope. Therefore, a measurement system and a measurement method for measurement by an optical microscope are needed.

SUMMARY

An embodiment of a measurement system to measure a hole of a substrate is provided, and the measurement system comprises a light source generation unit, a capturing unit and a processing unit. The light source generation unit is used to generate a light source and focus the light source, respectively, on a plurality of different height planes of a hole, along a height axis direction of the hole. The capturing unit captures a plurality of images scattered by the plurality of different height planes. The processing unit obtains boundaries of the hole on the plurality of different height planes according to the plurality of images thereby sampling image intensities of different azimuth angles on the boundaries of the hole on each of the plurality of different height planes to generate a plurality of sampling values, and developing a sidewall image of the hole according to the plurality of sampling values, heights of the plurality of different height planes and the different azimuth angles.

An embodiment of a measurement method to measure a hole of a substrate is provided, the measurement method comprises focusing a light source, respectively, on a plurality of different height planes of a hole, along a height axis direction of the hole, capturing a plurality of images scattered by the plurality of different height planes, obtaining boundaries of the hole on the plurality of different height planes according to the plurality of images, sampling image intensities of different azimuth angles on the boundaries of the hole on each of the plurality of different height planes to generate a plurality of sampling values, and developing a sidewall image of the hole according to the plurality of sampling values, heights of the plurality of different height planes and the different azimuth angles.

A detailed description is given in the following embodiments with reference to the accompanying drawings.

BRIEF DESCRIPTION OF DRAWINGS

The disclosure can be more fully understood by reading the subsequent detailed description and examples with references made to the accompanying drawings, wherein.

DETAILED DESCRIPTION

The following description is made for the purpose of illustrating the general principles of the disclosure and should not be taken in a limiting sense. The scope of the disclosure is best determined by reference to the appended claims.

Figure 1:
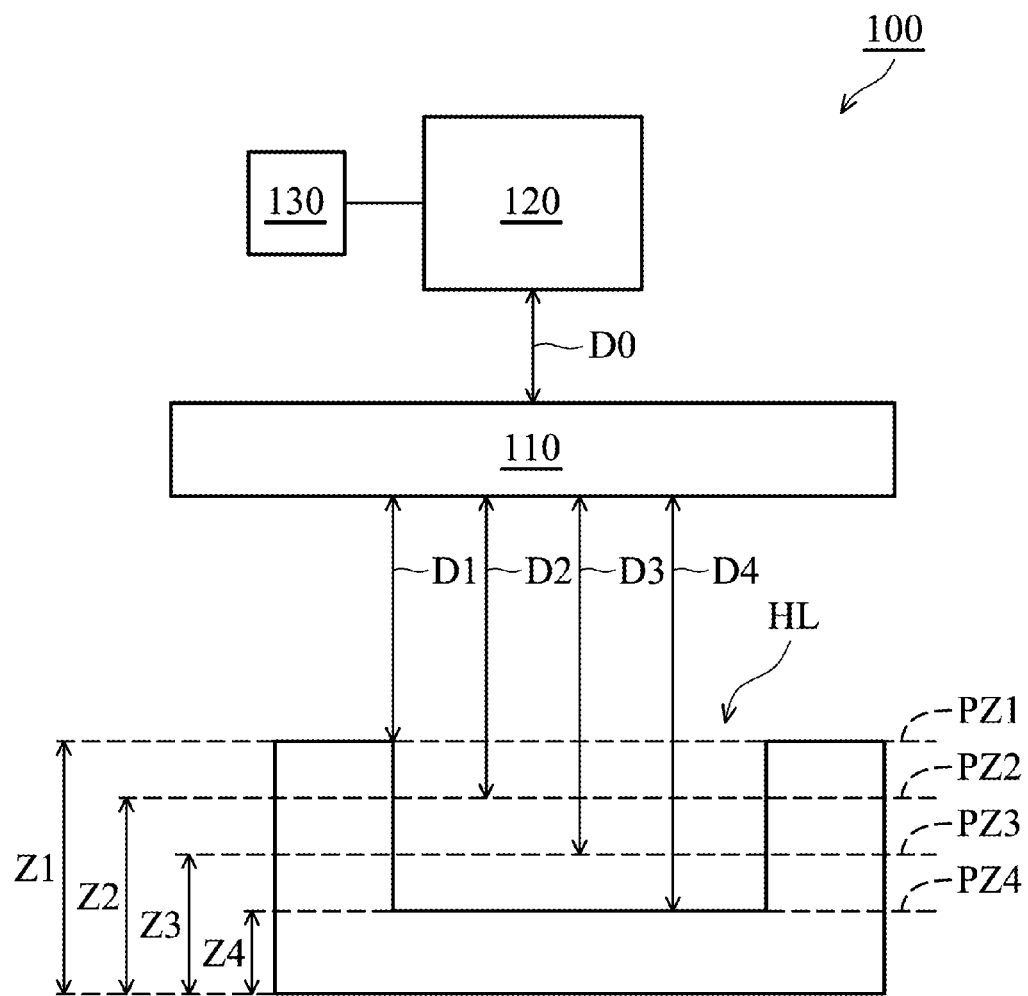
FIG. 1 is the schematic diagram of a measurement system in accordance with an exemplary embodiment.
Figure 2:
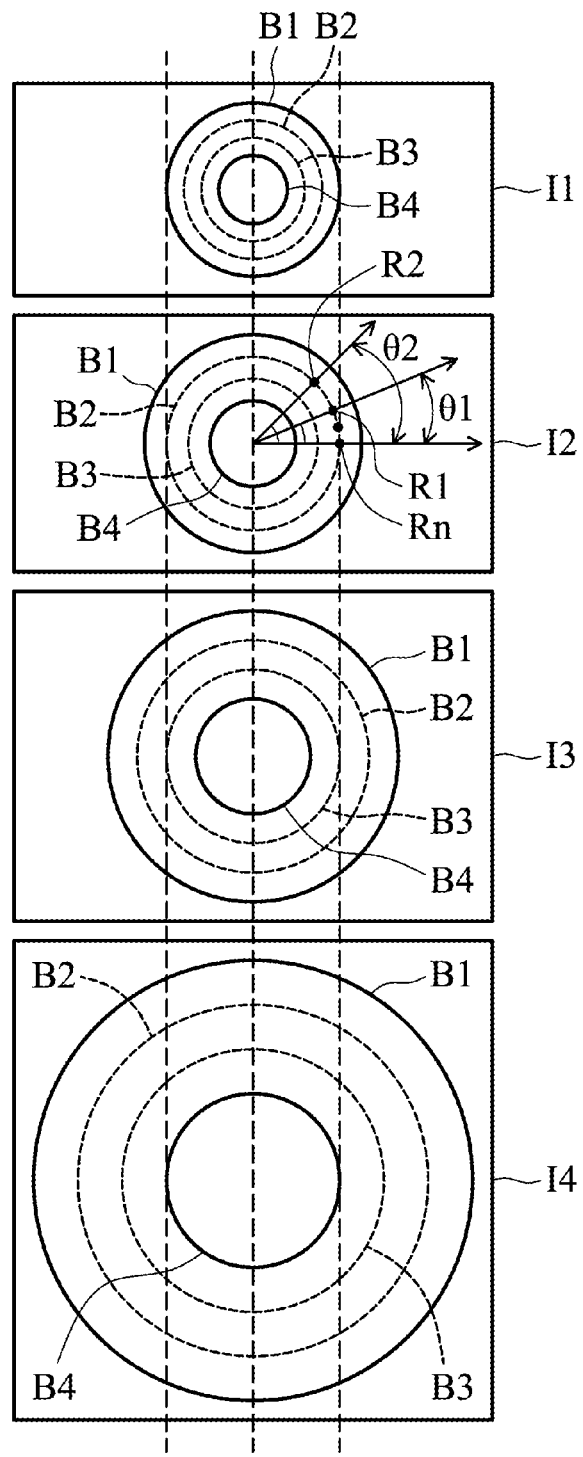
FIG. 2 is the schematic diagram of an image of a hole received by the measurement system in accordance with an exemplary embodiment.

FIG. 1 is the schematic diagram of a measurement system in accordance with an exemplary embodiment. Referring to FIG. 1, the measurement system 100 includes a light source generation unit 110, a capturing unit 120 and a processing unit 130. Specifically, each point of the sidewall of a hole can be expressed by the cylindrical system and written in the form of $(R, \theta, Z)$. The light source generation unit 110 is arranged to generate a light source, and to respectively focus the light source on a plurality different height of planes (such as planes PZ1~PZ4) of a hole, along the height axis direction (also called z axis) of the hole HL. The capturing unit 120 captures a plurality of images (as shown in FIG. 2) scattered from the plurality of different height planes PZ1~PZ4. The processing unit 130 is arranged to sample image intensities of different azimuth angles on boundaries of the hole on each of the plurality of different height planes, thereby generating a plurality of sampling values and developing a sidewall image of the hole HL according to the plurality of sampling values and heights of the plurality of different height planes and the different azimuth angles. In some embodiments, the capturing unit 120 and the processing unit 130 can be arranged within the light source generation unit 110, but, the disclosure is not limited thereto.

Figure 3:
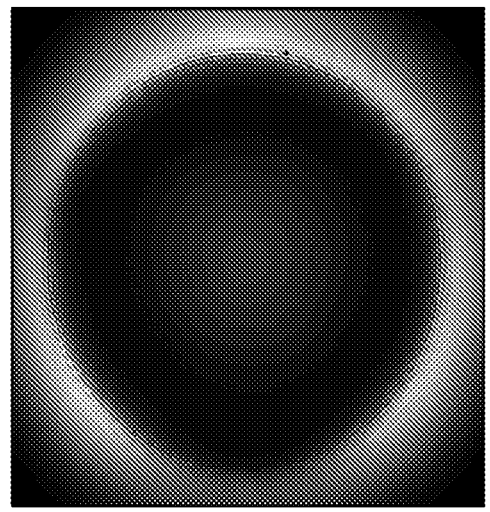
FIG. 3 is another image of a hole captured by the capturing unit 120.

FIG. 2 is the schematic diagram of an image of a hole received by the measurement system in accordance with an exemplary embodiment. Referring to FIG. 2, when the light source is focused on planes PZ1, PZ2, PZ3 and PZ4 of the plurality of different heights Z1, Z2, Z3 and Z4, the plurality of images I1, I2, I3 and I4 are respectively obtained. To further explain, circle B1, B2, B3 and B4 are boundaries of the hole on the plurality of different height planes PZ1, PZ2, PZ3 and PZ4. The magnification ratio of the plurality of different height planes PZ1~PZ4 are $$M1 = \frac{D0}{D1}, M2 = \frac{D0}{D2}, M3 = \frac{D0}{D3} \text{ and } M4 = \frac{D0}{D4},$$

respectively, wherein lengths D1, D2, D3 and D4 are the distances from the light source generation unit 110 to the plurality of different height planes PZ1, PZ2, PZ3 and PZ4 respectively, and D0 is the distance from the light source generation unit 110 to the capturing unit 120. Because D1<D2<D3<D4, therefore M1>M2>M3>M4. Accordingly, the captured images of the boundaries of the hole on the plurality of different height planes PZ1, PZ2, PZ3 and PZ4 do not overlap. FIG. 3 is an image of a hole captured by the capturing unit 120. Referring to FIG. 3, the boundaries of the hole on each of the plurality of different height planes do not overlap.

Therefore, when the light source is focused on the plurality of different height planes PZ1, the change in image intensity of the circle B1 increases in sensitivity. For example, the image intensity outside of the circle B1 is very weak, but the image intensity within the circle B1 is strong. Therefore, the boundary of the hole can be determined by the variations of the image intensity of the radical coordinate. Similarly, when the light source is focused on the plane PZ2, circle B2 can be determined as the boundary of the hole of the plane PZ2 from the image I2. When the light source is focused on the plane PZ3, circle B3 can be determined as the boundary of the hole of the plane PZ3 from the image I3. When the light source is focused on the plane PZ4, circle B4 can be determined as the boundary of the hole of the plane PZ4 from the image I4.

Figure 4:
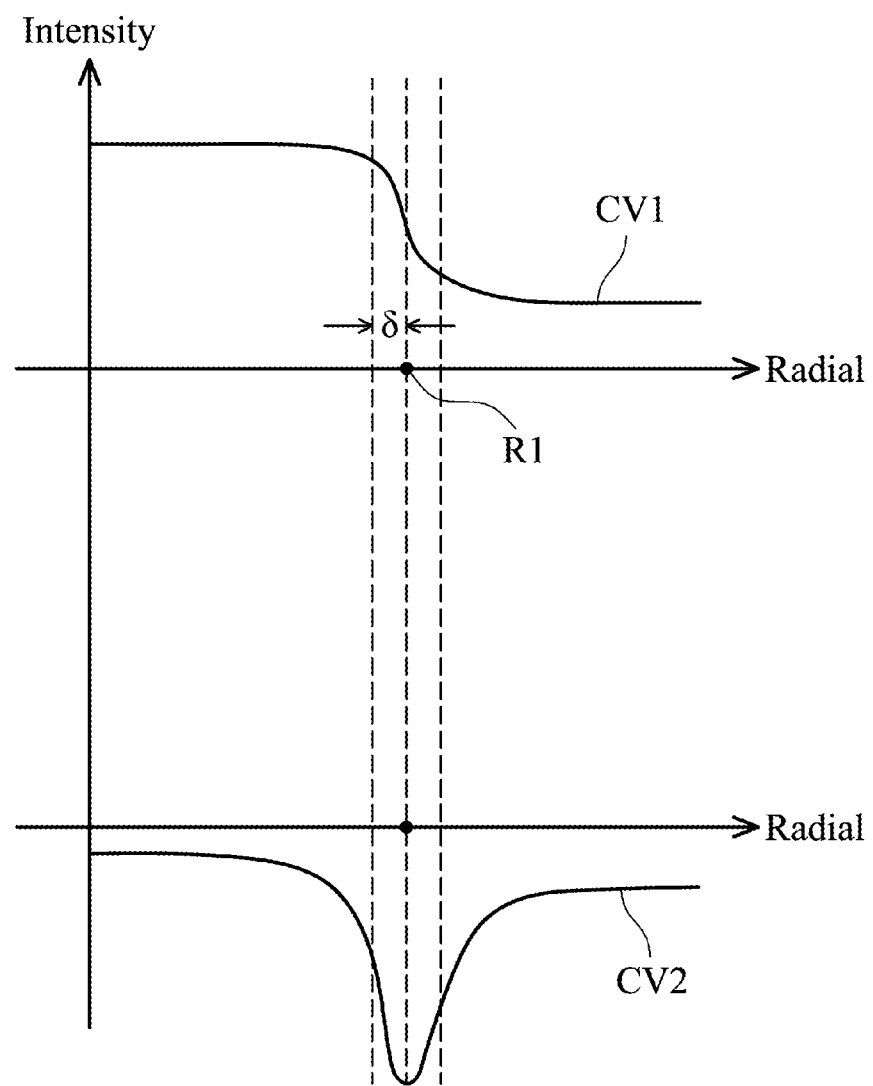
FIG. 4 is a schematic diagram of the relation between the image intensity and radial in accordance with an exemplary embodiment.

FIG. 4 is a schematic diagram of the relation between the image intensity and radial in accordance with an exemplary embodiment. As shown in FIG. 4, an intensity curve is along the radial coordinate r at a predetermined azimuth angle θ1. The intensity curve CV1 is differentiated by the radial coordinate to obtain the differential curve CV2. The processing unit 130 obtains a radial point R1 according to the maximum limit value of the differential curve CV2 and obtains the mean value VA1 of the image intensity in the region between R1+δ and R1−δ, and regards the mean value VA1 of the radial point R1 as the plurality of sampling values (image intensity) of the coordinate (R1, θ1, Z2). Referring to FIG. 2 again, in other words, the closed curve composed of the radial points at the azimuth angles can be regarded as the boundary of the hole in accordance with the plane PZ2.

Figure 5:
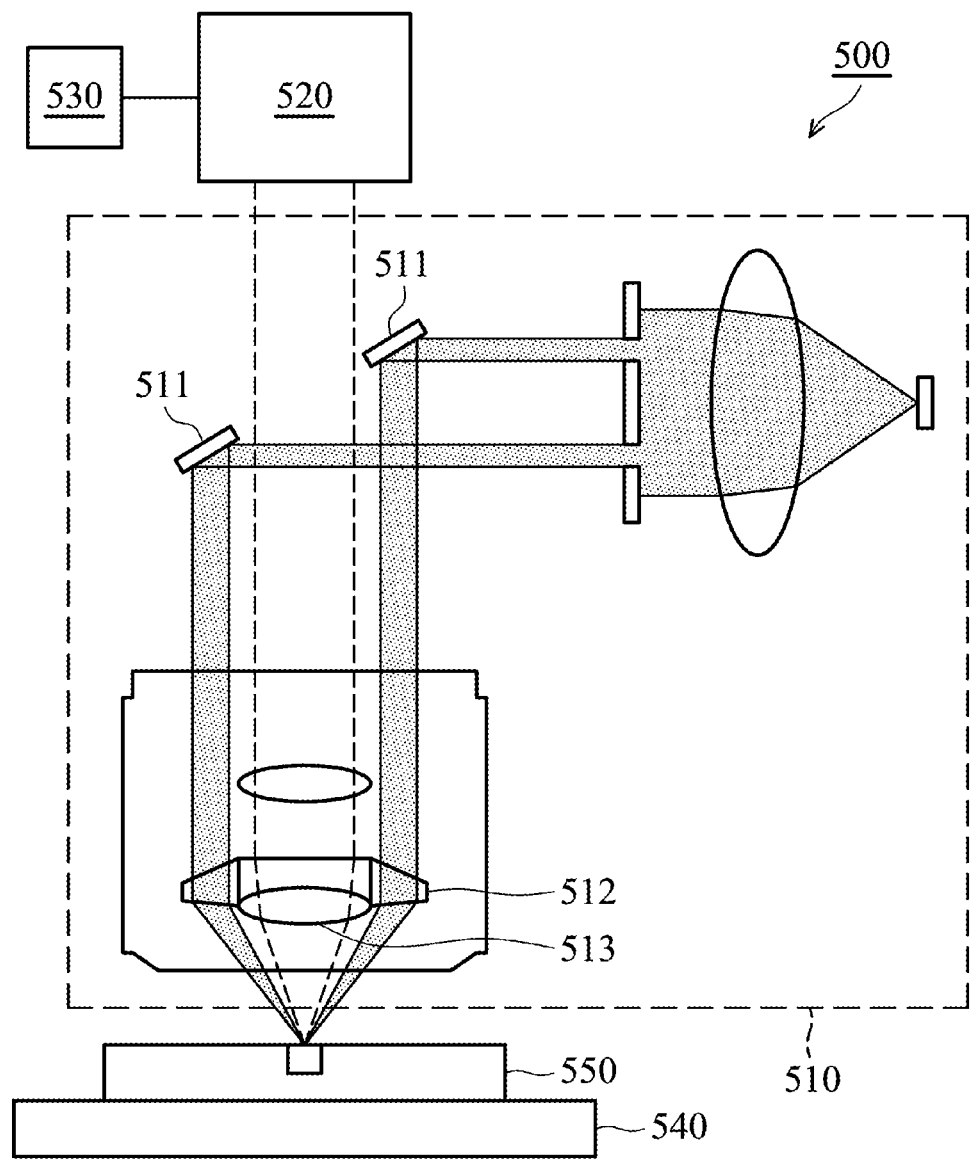
FIG. 5 is a measurement system in accordance with another exemplary embodiment.

FIG. 5 is a measurement system in accordance with another exemplary embodiment. Referring to FIG. 5, the measurement system 500 includes a light source generation unit 510, a capturing unit 520, a processing unit 530 and a platform 540. In the embodiment of the present disclosure, the light source generation unit 510 can be a dark field optical microscope. A light source is transmitted through a ring mirror 511 to a ring condenser lens 512, and through the ring condenser 512 to a target 550. The light scattered by the target 550 is transmitted through the objectives 513 to the capturing unit 520, but the light transmitted to the capturing unit 520 doesn't include the mirror reflected light transmitted to the target 550. The dark field device is different from the bright field device. Instead of observing illuminated light directly, the dark field device observes the scattered light from the target. Therefore, the viewing field is a dark background, but the target displays a bright image. The dark microscope is suitable for observing a figure and profile of tiny structures which can not be observed by the bright microscope. In the embodiment of the present disclosure, the target 550 is placed on the platform 540. By fixing the focal length and moving the platform 540 along the height axis direction of a hole, the light source can focus on the plurality of different heights of the hole.

Figure 6:
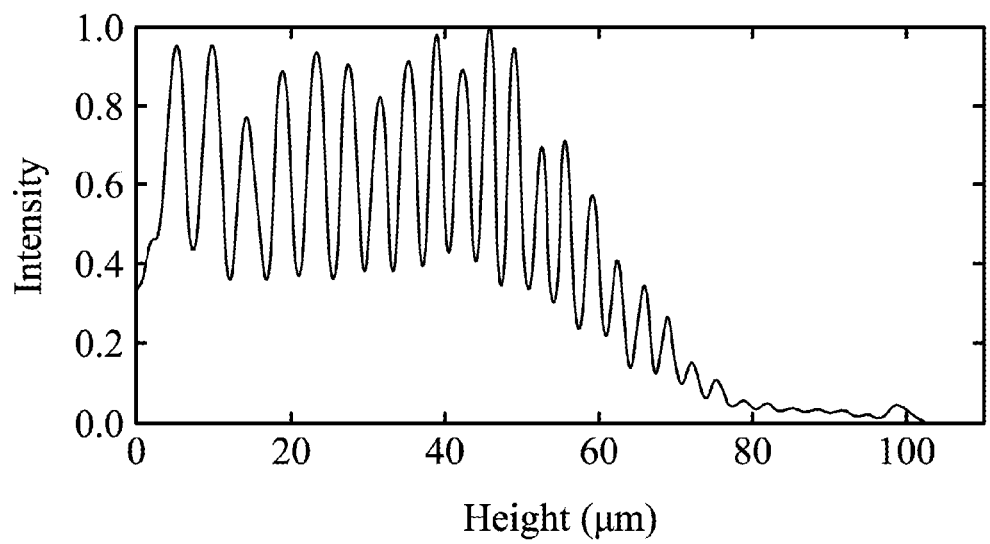
FIG. 6 is a schematic diagram of the relation between the image intensity and height in accordance with an exemplary embodiment.

FIG. 6 is a schematic diagram of the relation between the image intensity and height in accordance with an exemplary embodiment. Referring to FIG. 6, the horizontal axis is the height Z, and the vertical axis is the standardized image intensity. When fixing the azimuth angle and the radial length, the image intensity changes corresponding to the focus positions (height). By observation, it can be realized that there are periodical notches and bumps on the boundary of the hole.

Figure 7:
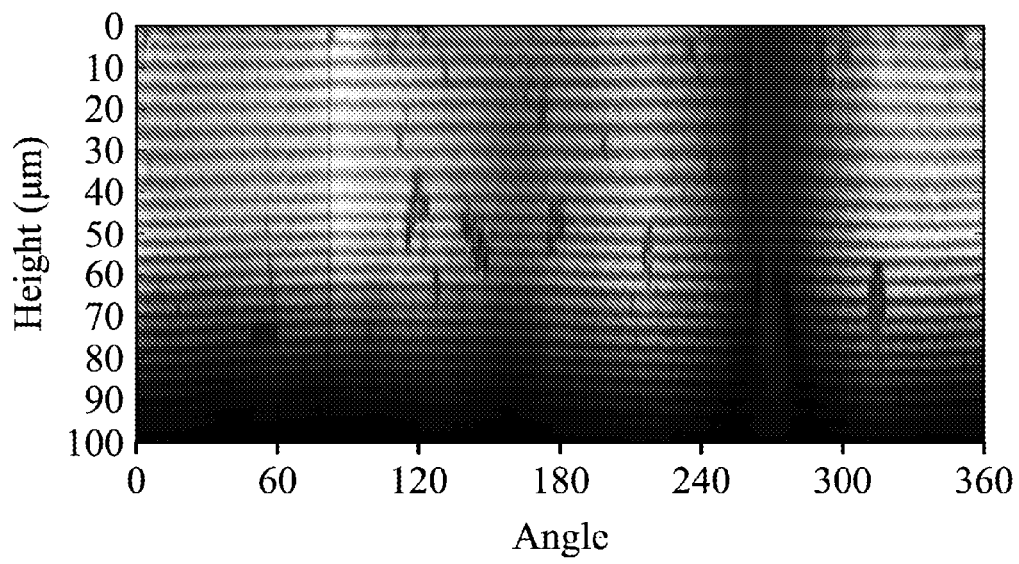
FIG. 7 is the sidewall image of a hole in accordance with an exemplary embodiment.
Figure 8A:
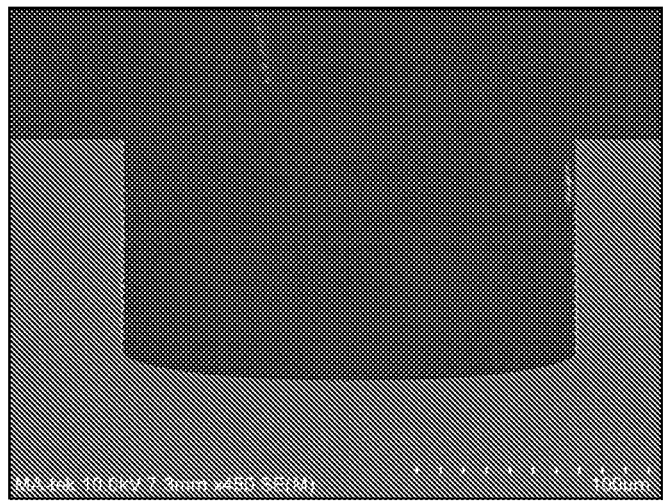
FIG. 8A and FIG. 8B are sidewall images of a hole obtained by a scanning electron microscope.
Figure 8B:
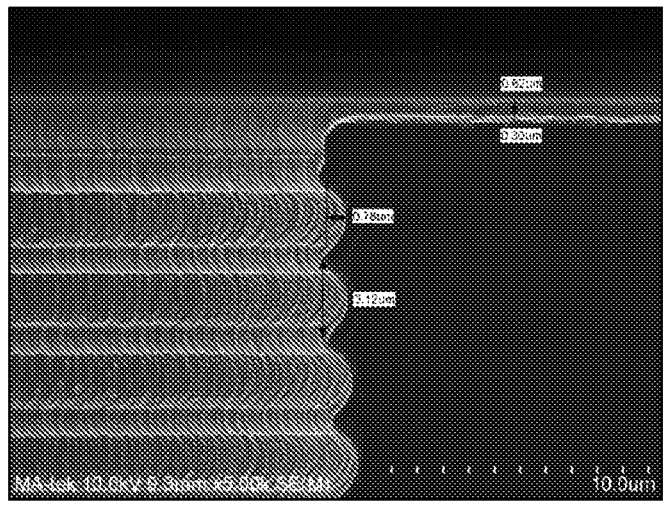

FIG. 7 is the sidewall image of a hole in accordance with an exemplary embodiment. FIG. 8A and FIG. 8B are sidewall images of a hole obtained by a scanning electron microscope. Referring to FIG. 7, the horizontal axis is the azimuth angle θ, and the vertical axis is the height Z. The sidewall image of the hole HL in FIG. 7 is developed according to the plurality of sampling values and the corresponding height Z and the azimuth angle θ. By observation, it can be realized that the sidewall of the hole has a scallop-type structure which is the same as that shown in FIGS. 8A and 8B.

Figure 9:
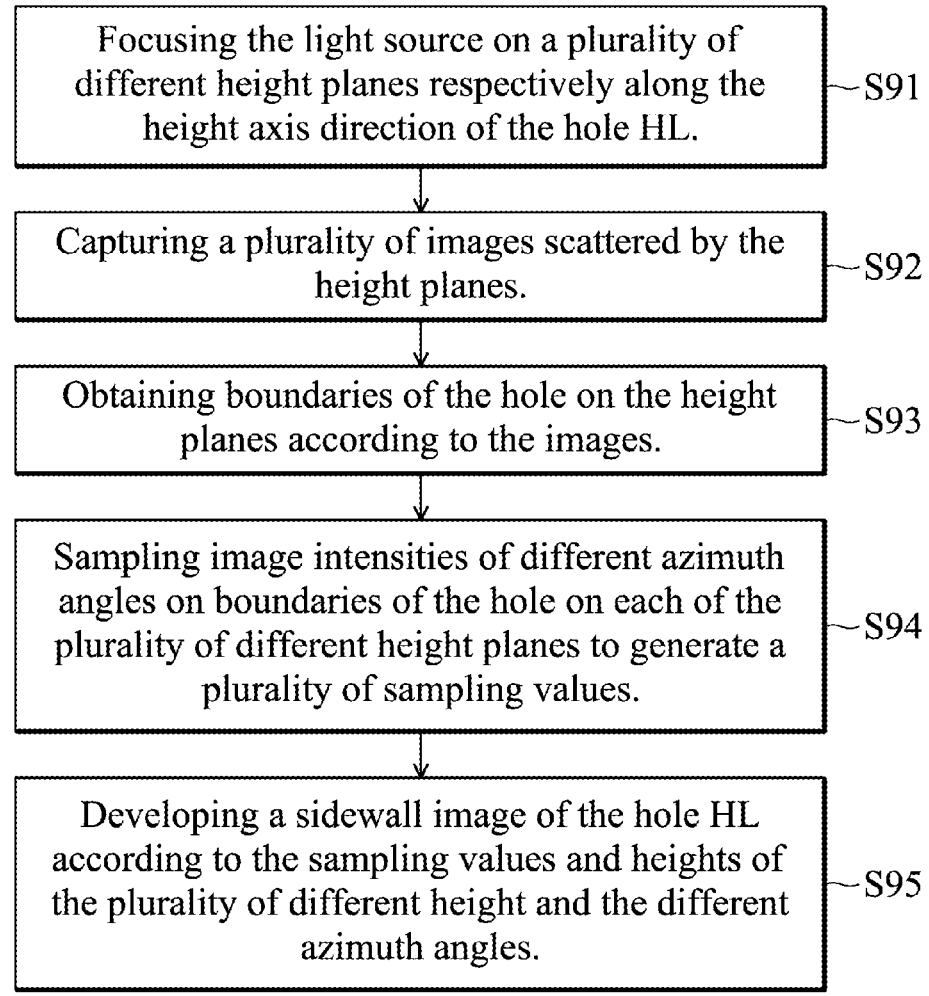
FIG. 9 is a flowchart of a measurement method in accordance with an exemplary embodiment.

FIG. 9 is a flowchart of a measurement method in accordance with an exemplary embodiment. Referring to FIG. 9, the measurement method includes the following steps.

In step S91, the light source is focused, respectively, on a plurality of different height planes (such as planes PZ1~PZ4) of a hole, along the height axis direction (also called z axis) of the hole HL. In step S92, a plurality of images scattered by the plurality of different height planes are captured. In step S93, boundaries of the hole on the plurality of different height planes are obtained according to the plurality of images. In step S94, image intensities of different azimuth angles on boundaries of the hole on each of the plurality of different height planes are sampled to generate a plurality of sampling values. In step S95, a sidewall image of the hole HL is developed according to the plurality of sampling values and heights of the plurality of different height and the different azimuth angles.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A measurement method, arranged to measure a hole of a substrate, the measurement method comprising:
    focusing a light source, respectively, on a plurality of different height planes of a hole, along a height axis direction of the hole;
    capturing a plurality of images scattered by the plurality of different height planes;
    obtaining boundaries of the hole on the plurality of different height planes according to the plurality of images;
    sampling image intensities of different azimuth angles on the boundaries of the hole on each of the plurality of different height planes to generate a plurality of sampling values; and
    developing a sidewall image of the hole according to the plurality of sampling values, heights of the plurality of different height planes and the different azimuth angles.

2. The measurement method as claimed in claim 1, wherein the step of obtaining boundaries of the hole comprises:
    differentiating the intensity of the plurality of images with a radial axis at a predetermined azimuth angle to obtain a differential curve;
    obtaining a radial point according to a maximum limit value of the differential curve; and
    using a closed curve composed of the radial points at the azimuth angles to serve as a boundary of the hole corresponding to a plane.

3. The measurement method as claimed in claim 1, wherein the step of focusing the light source on the plurality of planes respectively comprises:
    placing the substrate on a platform; and
    fixing a focal length and moving the platform along the height axis direction such that the light source is focused on the plurality of different height planes, respectively.

4. The measurement method as claimed in claim 1, wherein the light source is a light source generation unit comprising a dark field optical microscope.

5. A measurement system, arranged to measure a hole of a target, comprising:
- a light source generation unit, arranged to generate a light source and focus the light source, respectively, on a plurality of different height planes of a hole along a height axis direction of the hole;
- a capturing unit, capturing a plurality of images scattered by the plurality of different height planes; and
- a processing unit, obtaining boundaries of the hole on the plurality of different height planes according to the plurality of images to
- sample image intensities of different azimuth angles on the boundaries of the hole on each of the plurality of different height planes to generate a plurality of sampling values, and developing a sidewall image of the hole according to the plurality of sampling values, heights of the plurality of different height planes and the different azimuth angles.

6. The measurement system as claimed in claim 5, wherein the processing unit differentiates the intensity of the plurality of images by a radial axis at a predetermined azimuth angle to obtain a differential curve, and obtains a radial point according to a maximum limit value of the differential curve, and uses a closed curve composed of the radial points at the azimuth angles to serve as a boundary of the hole corresponding to a plane.

7. The measurement system as claimed in claim 5, further comprising:
- a platform, arranged for placement of the target, wherein a focal length of the light source is fixed such that the light source is focused on the plurality of different height planes of the hole when the platform moves along the height axis direction.

8. The measurement system as claimed in claim 5, wherein the light source generation unit comprises a dark field optical microscope.

* * * * *